(12) United States Patent
Snyder et al.

(10) Patent No.: US 12,702,115 B2
(45) Date of Patent: Aug. 11, 2026

(54) PET TREAT DISPENSER

(71) Applicant: The Toronto-Dominion Bank, Toronto (CA)

(72) Inventors: Michael Duke Snyder, Philadelphia, PA (US); Joseph William Nulty, Philadelphia, PA (US); Kyle Mardo, Cumberland, RI (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 19/073,831

(22) Filed: Mar. 7, 2025

(65) Prior Publication Data

US 2025/0338820 A1 Nov. 6, 2025

Related U.S. Application Data

(60) Provisional application No. 63/642,231, filed on May 3, 2024.

(51) Int. Cl.
*A01K 5/02* (2006.01)

(52) U.S. Cl.
CPC .......... *A01K 5/0233* (2013.01); *A01K 5/0291* (2013.01)

(58) Field of Classification Search
CPC ........ A01K 5/0233; A01K 5/02; A01K 5/025; A01K 5/0275
See application file for complete search history.

(56) References Cited

U.S. PATENT DOCUMENTS

| | | | | |
|---|---|---|---|---|
| 2015/0181801 A1* | 7/2015 | Niemela | ............. | A01C 17/001 119/51.01 |
| 2017/0223926 A1* | 8/2017 | Ausman | ............... | A01K 11/006 |
| 2019/0350165 A1* | 11/2019 | Klocke | ................ | A01K 5/0233 |
| 2024/0081282 A1* | 3/2024 | Franklin | ............. | A01K 5/0128 |

* cited by examiner

*Primary Examiner* — Monica L Perry
(74) *Attorney, Agent, or Firm* — Rowand LLP

(57) ABSTRACT

In an aspect, an automated teller machine (ATM) style pet treat dispenser is described. The ATM style pet treat dispenser includes a housing resembling an ATM. The housing may define an opening. The ATM style pet treat dispenser may include a pet treat dispenser disposed within the housing and arranged to output a treat through the opening. The ATM style pet treat dispenser may include a pet presence detector configured to generate a signal indicating the presence of a pet at a particular location relative to the housing. The ATM style pet treat dispenser may include a controller. The controller may be configured to activate the pet treat dispenser in response to detecting the presence of a pet at the particular location relative to the housing based on the signal indicating the presence of the pet. The ATM style pet treat dispenser may use artificial intelligence.

20 Claims, 11 Drawing Sheets

PET TREAT DISPENSER

CROSS-REFERENCE TO RELATED APPLICATIONS

The present application claims priority to U.S. Provisional Patent Application No. 63/642,231 filed May 3, 2024, the contents of which are incorporated herein by reference.

FIELD

The present application relates to pet treat dispensers and, more particularly, to a pet treat dispenser for dispensing a treat in response to detecting a pet.

BACKGROUND

Pet treats, such as dog treats and cat treats, are often provided by pet owners to pets. Such treats may include, for example, biscuits, bars, cookies, kibbles, etc. Typically, these treats are provided directly by a human to a pet.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
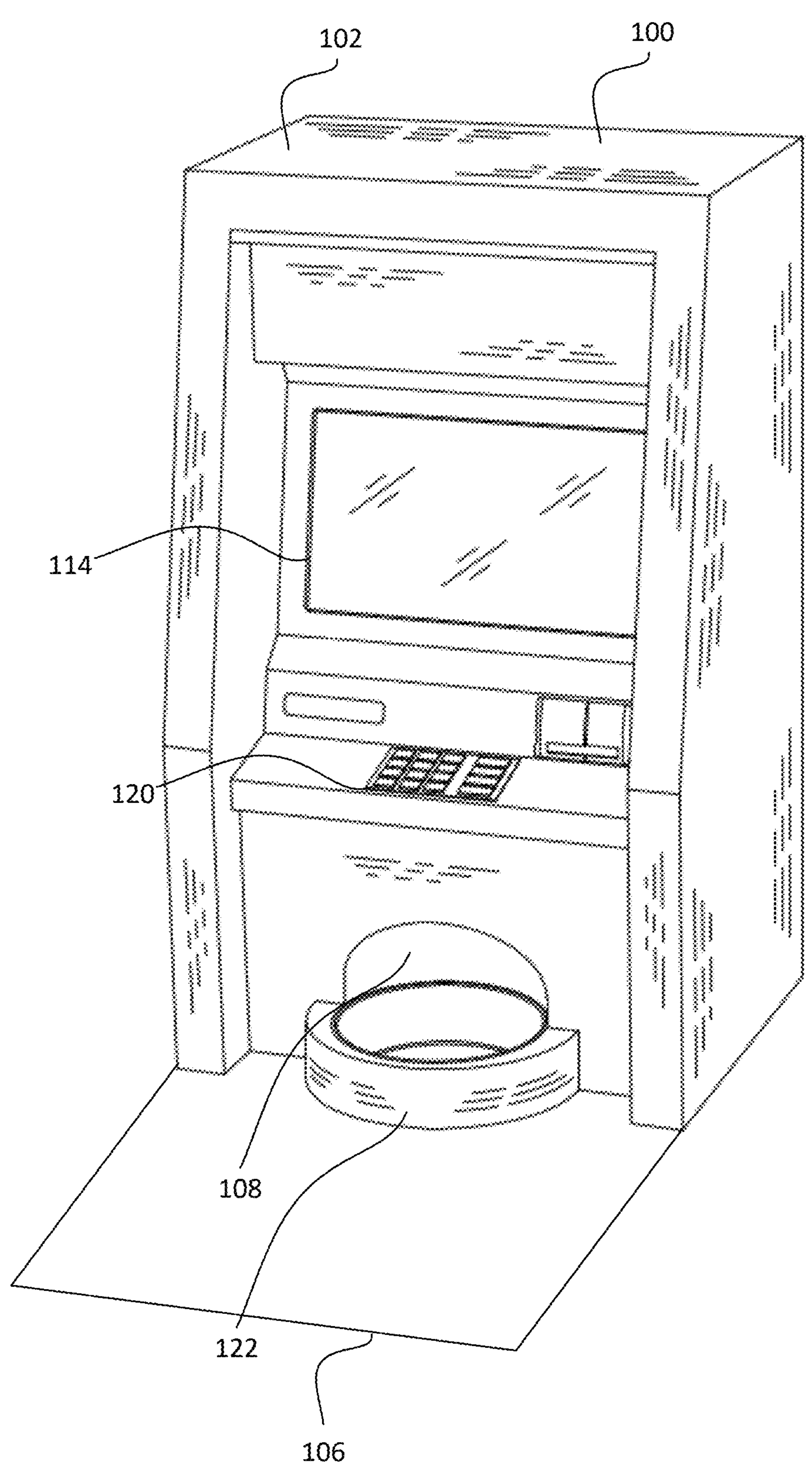
FIG. 1 is a perspective view of a pet treat dispenser.
Figure 2:
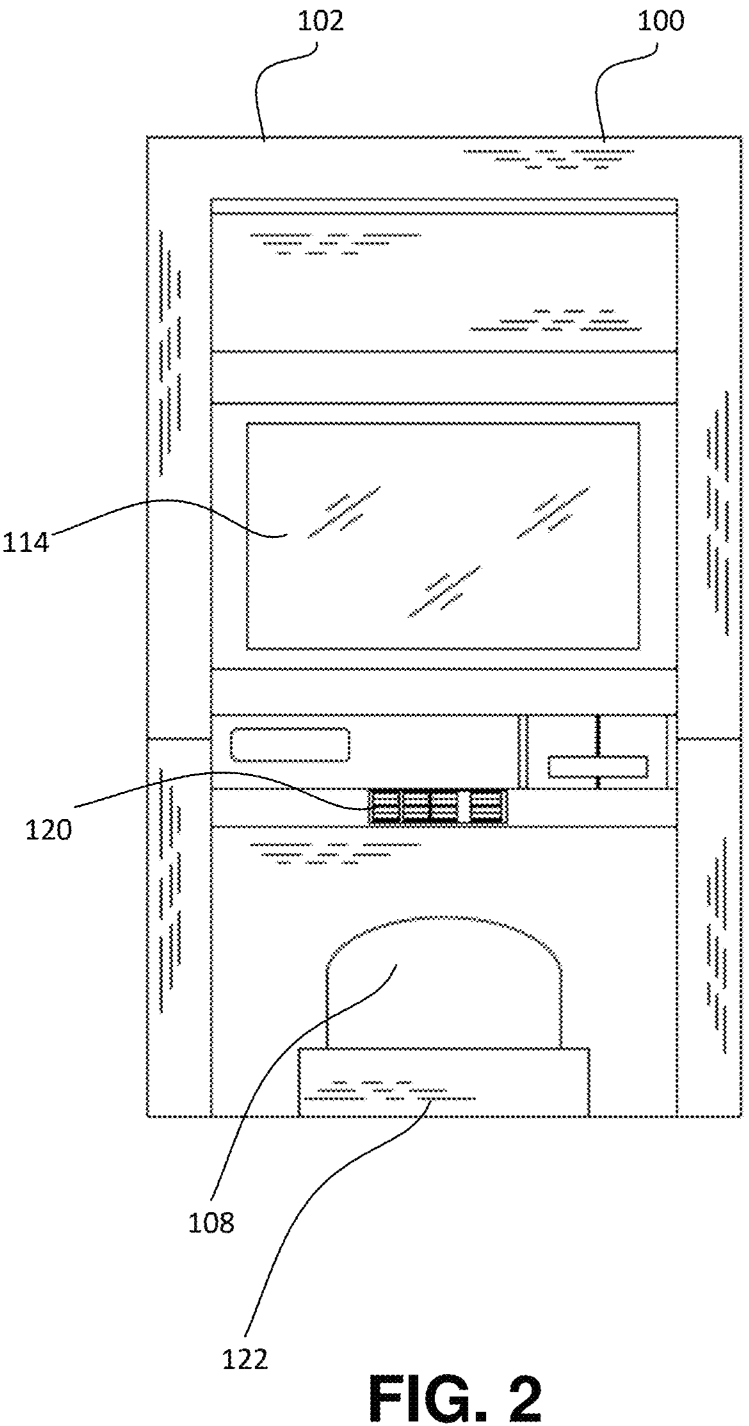
FIG. 2 is a front elevation view of the pet treat dispenser.

The present application describes pet treat dispensers. Conveniently, at least some of the pet treat dispensers described herein may have detection features which dispense a treat in response to detecting a pet. For example, the pet treat dispenser may automatically dispense a pet treat in response to detecting a pet. In some implementations, other preconditions may need to be detected before a pet treat will be dispensed by the pet treat dispenser. For example, in some implementations, the pet treat dispenser may be integrated into an automated teller machine (ATM) and a pet owner may need to authenticate at the ATM in order to enable the dispensing. In some implementations, the pet treat dispenser may be configured to dispense a pet treat only after an action, or an action of a defined type, is completed at an ATM. For example, the pet treat dispenser may be configured to dispense the pet treat when a customer has performed a specific operation at the ATM, such as withdrawing a value instrument.

The pet treat dispenser may be styled as an ATM and/or integrated with an ATM. Such an arrangement may allow for a number of efficiencies and improvements. For example, it may be that the pet treat dispenser may be styled to resemble an ATM that is located at a common premises. The ATM-styling of the pet treat dispenser may conveniently indicate that the item is used to dispense something, since customers might be expected to be familiar with ATMs and their dispensing function. The ATM styling also signifies to a pet owner the side of the pet treat dispenser at which a pet should be situated in order to initiate dispensing. That is, since customers are expected to know which side of an ATM is the "front", they may automatically understand the side of the ATM at which the pet should be situated. Further, features of an ATM, such as a display screen, may also be convenient to include in a pet treat dispenser and they may serve to improve the pet treat dispenser. For example, the display might output a video which includes features that attract or engage pets, serving to draw pets towards the pet treat dispenser.

In an aspect, an automated teller machine (ATM) style pet treat dispenser is described. The ATM style pet treat dispenser may include a housing resembling an ATM. The housing may define an opening. The ATM style pet treat dispenser may include a pet treat dispenser disposed within the housing and arranged to output a treat through the opening. The ATM style pet treat dispenser may include a pet presence detector configured to generate a signal indicating the presence of a pet at a particular location relative to the housing. The ATM style pet treat dispenser may include a controller configured to activate the pet treat dispenser in response to detecting the presence of a pet at a particular location relative to the housing based on the signal indicating the presence of the pet.

In some implementations, the pet presence detector may include a pressure sensitive mat and the controller may be configured to activate the pet dispenser based on a pressure indicated by the pressure sensitive mat.

In some implementations, the pressure sensitive mat is situated on a floor at a front side of the housing.

In some implementations, the controller may be configured to define a dispensing parameter for the pet treat dispenser to control an amount of pet treats dispensed based on an amount of pressure indicated by the pressure sensitive mat so that a greater amount of pet treats are distributed to a larger pet than to a smaller pet.

In some implementations, the pet presence detector may include a camera. The pet presence detector may detect presence of the pet at the particular location based on an automated analysis of camera data generated by the camera.

In some implementations, the pet presence detector detects a pet type based on an automated analysis of the camera data generated by the camera. The controller may be configured to define a dispensing parameter for the pet treat dispenser based on the detected pet type.

In some implementations, configuring the dispensing parameter may include one or more of: configuring an amount of pet treats dispensed to the pet based on the pet type and configuring a type of pet treat dispensed to the pet based on the pet type.

In some implementations, the ATM style pet treat dispenser may include a display. The display may be situated at a location corresponding to a location of a display in an ATM. The controller may be configured to cause the display to be updated in response to detecting the presence of the pet at the particular location.

In some implementations, updating the display may include outputting a video that is based on one or both of a size and type of the pet.

In some implementations, outputting the video that is based on one or both of a size and type of the pet includes retrieving a video from a memory based on one or both of the size and type of the pet.

In some implementations, the controller may be further configured to generate a video using generative artificial intelligence based on data obtained from the pet presence detector. Updating the display may include outputting the video.

In some implementations, the ATM style pet treat dispenser of claim 1 may further include features that are associated with an ATM. Such features may include a value instrument dispenser, a card reader, an input device, a display, a communication module and a processor. The processor may be coupled to the communications module, the value instrument dispenser, the card reader, the controller, the display and the input device.

The processor may be configured to authenticate a customer as being associated with a card that has been read by the card reader using input received at the input device and to selectively control the value instrument dispenser after authentication of the customer. The processor may be configured to place the controller in an active state in which it may activate the pet treat dispenser in response to completion of an action requiring input from the input device.

In some implementations, the action requiring input from the input device may include successfully authenticating the customer based on input received via the input device.

In some implementations, the action requiring input from the input device may include dispensing a value instrument via the value instrument dispenser based on input received via the input device.

In some implementations, the action requiring input from the input device may include an account management operation.

In some implementations, the action requiring input from the input device may include input of a confirmation that a pet treat is to be dispensed. In some implementations, the controller of the treat dispenser may be configured to provide a signal to the processor to indicate the presence of a pet at the particular location. The processor may be configured to control the display to output a request for input to confirm that a pet treat should be dispensed when the signal indicates the presence of a pet at the particular location.

In some implementations, the opening for the pet treat dispenser may be configured to resemble a value instrument dispenser. That is, the opening through which the pet treats are dispensed resembles the value instrument dispenser.

In some implementations, the controller may be configured to store a profile of the detected pet and to prevent immediate dispensing of a further treat to the detected pet.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

An example pet treat dispenser having features described above is illustrated in FIGS. 1 to 5.

An automated teller machine (ATM) style pet treat dispenser 100 is illustrated in FIGS. 1 to 5. The ATM style pet treat dispenser 100 may include a housing 102. The housing may resemble an ATM. For example, the housing may be generally ATM-shaped and may have features that are similar to the features of an ATM.

The housing 102 may define an opening 108. The opening may be an opening through which a treat may be dispensed. In the illustrated example, the opening 108 opens into a receptacle 122, such as a bowl. The receptacle 122 may receive a pet treat when the pet treat is dispensed.

In some implementations (not illustrated), the opening 108 may be configured to resemble a value instrument dispenser. That is, the opening 108 may be an opening that resembles a dispenser typically used to dispense currency.

Figure 5:
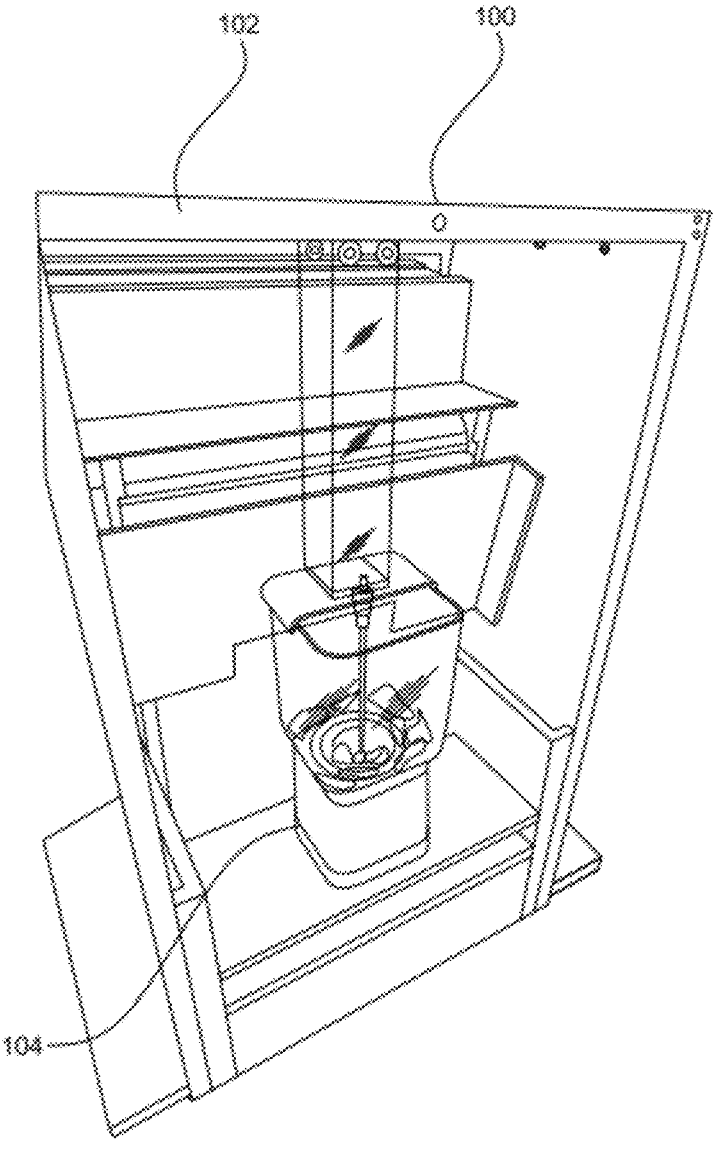
FIG. 5 is a rear view of the pet treat dispenser, showing internal components of the pet treat dispenser.

The ATM style pet treat dispenser 100 may include a pet treat dispenser 104 (FIG. 5). The pet treat dispenser 104 may be disposed within the housing 102. The pet treat dispenser may be arranged to output a treat through the opening 108. The pet treat dispenser 104 is, in the illustrated example, a modified candy or treat dispenser. For example, the pet treat dispenser 104 may be a modified gumball machine. In the illustrated example, the pet treat dispenser 104 includes a filling feature, which is a filling tube in the example. The filling tube may have an end that is coupled to the housing 102 and an end that is coupled to the pet treat dispenser 104. The housing may define an opening to which the filling tube may be connected. The opening may be at a top side of the housing 102. The opening may have an associated cap for capping the filling tube when not in use. The end of the filling tube that is connected to the pet treat dispenser 104 may be connected to the pet treat dispenser 104 such that an opening of the filling tube is relatively above a container or cavity that stores pet treats in the pet treat dispenser 100. The filling tube may be used to fill the pet treat dispenser 104 with pet treats. For example, treats may be placed into or poured into the filling tube in order to fill the pet treat dispenser 104.

The ATM style pet treat dispenser 100 may include a pet presence detector 106. The pet presence detector may be configured to generate a signal indicating the presence of a pet at a particular location. The particular location may be a location relative to the housing 102. For example, the particular location may be a location in front of the housing 102.

In some implementations, such as in the example of FIG. 1, the pet presence detector 106 may include a pressure sensitive mat. The pressure sensitive mat may include, for example, one or more pressure sensors. The pressure sensors may generate a signal based on an amount of pressure applied to the pressure sensitive mat. The pressure sensitive mat may vary in size, but it is generally large enough to be activated by one or more paws of a pet.

In the illustrated example, the pressure sensitive mat is situated on a floor at a front side of the housing 102.

The pet presence detector 106 may take other forms. For example, in some implementations, the pet presence detector

106 may include a camera. The camera may be situated in the housing 102, for example. The camera may be positioned to capture an image of an area in front of the pet treat dispenser 100. The pet presence detector 106 and/or a controller may detect presence of a pet at the particular location based on an automated analysis of camera data generated by the camera.

The pet presence detector 106 and/or a controller may detect a pet type based on an automated analysis of the camera data generated by the camera. For example, the pet presence detector 106 may access stored pet profile data which may be used in the analysis. In some implementations, an automated intelligence system may be used to identify the pet type and/or a category associated with the pet.

Artificial Intelligence (AI) may be used for pet detection and/or classification. For example, the camera data may be used through computer vision and/or machine learning techniques.

The detection and/or classification process may start with the capture of camera data, such as an image or video feed by the camera. Such capture may be triggered based on detection of a pet by the pet presence detector 106 and/or may be triggered based on motion detection or new object detection.

The camera data may be preprocessed by resizing, normalizing, and/or reducing noise to enhance the quality of the image. These preprocessing steps may help the AI model to effectively extract and analyze relevant features.

After preprocessing, Convolutional Neural Networks (CNNs) may be employed for object detection, enabling the AI to segment the image and identify potential objects of interest, such as a pet. The system may use pre-trained models that can locate distinctive anatomical features, such as the shape of the head, ears, tail, and fur patterns. The AI may then perform feature extraction, encoding these visual characteristics into high-dimensional vectors, which are used to distinguish between various pet types.

Once the features are extracted, the AI system may classify the pet by comparing the extracted data with a large dataset of labeled images. This enables the system to categorize the pet as a dog, cat, or other animal. Deep learning architectures, trained on vast amounts of image data, may allow for detailed classification. In some instances, the classification may even identify breeds of pets.

In addition to classification, AI can be used to estimate the pet's size by analyzing the relative scale of features within the image. This could involve categorizing the pet into size ranges such as "small," "medium," or "large." Alternatively, the system may use a numerical scale, for example, 0 to 10, where extreme values (0 or 10) correspond to very small or large animals, and intermediate values represent medium-sized pets. Size categorization may rely on spatial analysis and machine learning regression to estimate relative proportions, learned from large image datasets.

Generative AI may also play a role in the categorization and/or identification tasks. For example, a generative adversarial network (GAN) could be used to generate synthetic pet images that help augment training datasets. In scenarios where labeled data is limited, generative AI could produce realistic images of various pet breeds, sizes, and poses, allowing the model to train on more diverse data. This may enhance the AI's ability to generalize and improve accuracy when recognizing pets in real-world scenarios. Furthermore, generative models can be used to simulate different environmental conditions, lighting, or pet interactions, further refining the model's robustness.

Additionally, generative AI could assist in generating potential "what-if" scenarios for pet classification. For instance, it could simulate how a pet might appear under different angles or lighting conditions, improving the model's ability to detect pets in various environments. This would be particularly useful in surveillance systems or when identifying pets in diverse settings like shelters or wildlife habitats.

In some instances, a camera data, such as an image, may be sent to an artificial intelligence (AI) system, such as a generative AI system, with a prompt or instruction to cause the AI system to output an indication of a type of pet included in the camera data. For example, the prompt or instruction may be "What type of animal is identified in this image?" The generative AI may then be used to also determine a size of the pet relative to other pets of the same type. For example, a prompt or instruction may be "How large is this animal relative to other animals of the same type (i.e., relative to other dogs if this is a dog or relative to other cats if this is a cat)?" The prompt may include a formatting instruction such as "Provide your response on a scale of 1-10 with 10 being the largest".

In some implementations, the ATM style pet treat dispenser may include a display 114. The display 114 may be situated at a location corresponding to a location of a display in an ATM.

Figure 6:
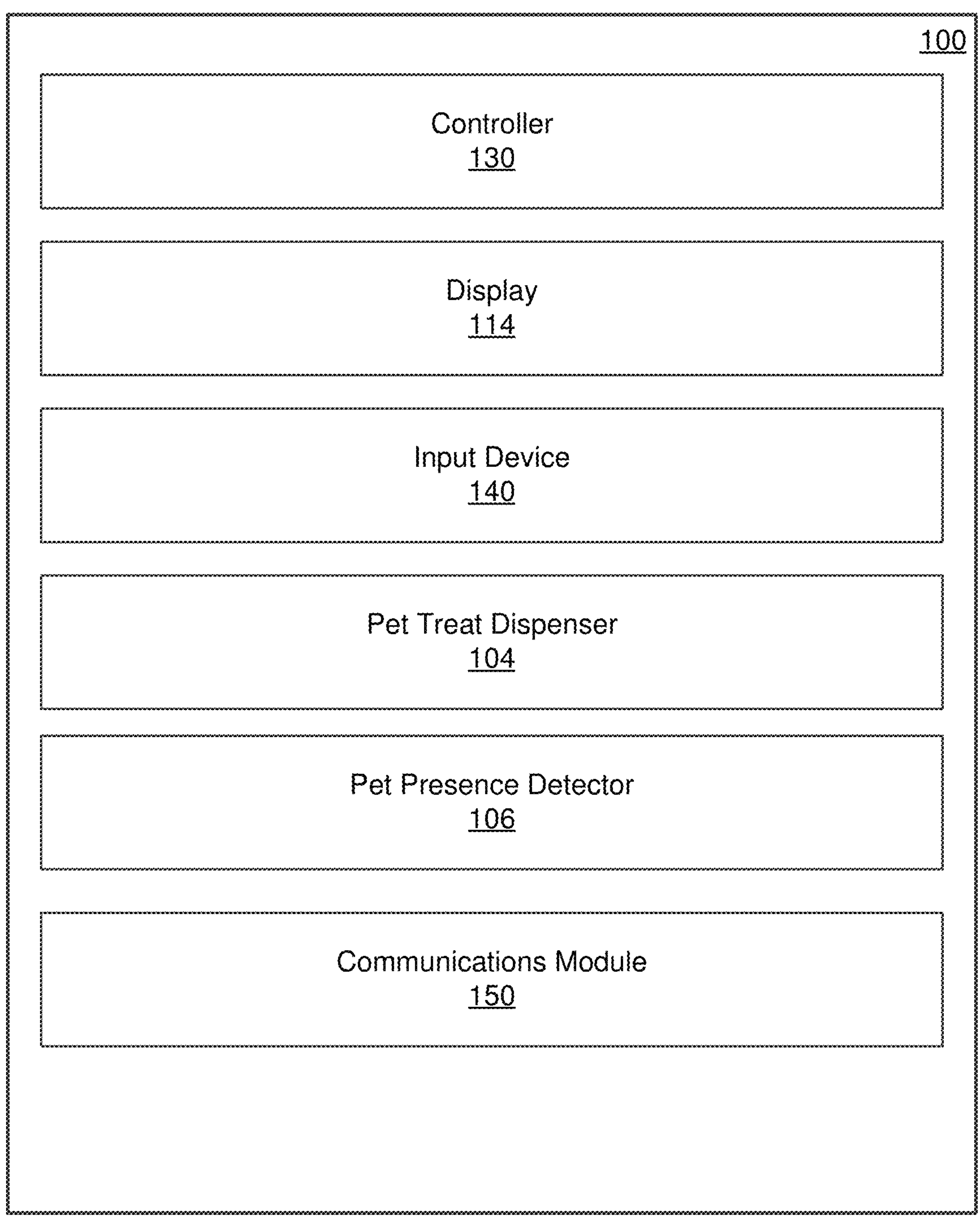
FIG. 6 is a block diagram showing example components of the pet treat dispenser.

An example block level diagram showing interaction of the various components of the pet treat dispenser is illustrated in FIG. 6.

The block level diagram of FIG. 6 illustrates components of an ATM-style pet treat dispenser 100. The pet treat dispenser may include the display 114, an input device 140, the pet treat dispenser 104, the pet presence detector 106, a communications module 150 and a controller 130.

The controller 130 may be electrically coupled with any one or more of the display 114, input device 140, pet treat dispenser 104, pet presence detector 106, and/or communications module 150. The controller 130 may, in some implementations, control one or more of these components. The controller 130 may, in some implementations, receive input from one or more of these components.

The controller 130 may be configured to perform operations described herein. For example, the controller may be configured with instructions which, when executed, cause the controller to perform such operations. For example, the controller may be configured to activate the pet treat dispenser 104 in response to detecting the presence of a pet. For example, the controller 130 may be configured to activate the pet treat dispenser 104 in response to detecting the presence of a pet at the particular location relative to the housing. Such detection may be performed based on a signal indicating the presence of the pet, which may be output by a pressure sensitive mat. Put differently, the controller 130 may be configured to activate the pet dispenser based on a pressure indicated by the pressure sensitive mat. If the pressure represented by an output of the mat exceeds a threshold, then the controller 130 may trigger the pet treat dispenser 104 to initiate dispensing.

In some implementations, the controller 130 may be configured to define a dispensing parameter for the pet treat dispenser to control an amount of pet treats dispensed based on an amount of pressure indicated by the pressure sensitive mat so that a greater amount of pet treats are distributed to a larger pet than to a smaller pet.

The controller may detect the presence of the pet at the particular location based on an automated analysis of camera data generated by the camera.

In some implementations, the controller detects a pet type based on an automated analysis of the camera data generated by the camera. The controller may be configured to define a dispensing parameter for the pet treat dispenser based on the detected pet type. For example, the controller 130 may configure an amount of pet treats dispensed to the pet based on the pet type and/or configure a type of pet treat dispensed to the pet based on the pet type. By way of example, in some instances, cats may be dispensed different treats than dogs.

By analyzing the camera data, the controller may prevent dispensing of a pet treat to, for example, a human. For example, if a small child is detected, the controller may not dispense a pet treat (in some cases, even where a pet is detected), in order to prevent consumption of the pet treat by the small child.

The controller 130 may be configured to cause the display to be updated in response to detecting the presence of the pet at the particular location. For example, the controller 130 may display a video on the display in response to detecting the presence of the pet. In some implementations, updating the display may include outputting a video that is based on one or both of a size and type of the pet. For example, a video of a pet that substantially corresponds to one or both of the size and type of the pet that has been detected may be displayed. This video may, for example, show pet treats being dispensed to the pet.

In some implementations, outputting the video that is based on one or both of a size and type of the pet may include retrieving a video from a memory based on one or both of the size and type of the pet. For example, a video may be retrieved which depicts an animal that is the same type as the detected pet (e.g., it may be a dog if the pet is a dog and/or may be of the same breed). Additionally or alternatively, the video may be retrieved based on the size of the pet. For example, the video may depict an animal of a similar size to the detected pet.

In at least some implementations, generative artificial intelligence (AI) may be used to obtain the video. For example, the controller may generate the video using generative artificial intelligence based on data obtained from the pet presence data and this video may be output on the display associated with the ATM. By way of example, the controller may provide the data obtained from the pet presence data, such as an image or video of the pet or pressure or weight data, to a generative AI engine along with a prompt that causes the generative AI engine to generate content, such as a video. By way of example, the prompt may request the generative AI engine to generate a video depicting the pet defined by the pet presence data performing a particular action, such as receiving a treat via the pet treat dispenser.

The controller 130 may operate to prevent over-dispensing to a pet. For example, the controller may be configured to store a profile of the detected pet (i.e., a pet that has received a treat) and to prevent immediate dispensing of a further treat to the detected pet. In some implementations, the controller may prevent further pet treat dispensing to the same pet for at least a predetermined amount of time. In some instances, the controller may use image recognition and/or artificial intelligence to determine whether a particular pet has already received a treat. That is, image recognition and/or artificial intelligence may be used to determine whether a pet that has been detected has already received a pet treat. In some instances, the determination of whether the pet that has been detected has already received a treat may be based on an amount of pressure registered at the pressure sensitive mat that is used for detecting the presence of the pet in some instances. For example, in one implementation, the pet treat dispenser may prevent dispensing another treat to a pet that has a same or similar (e.g., within a threshold) pressure profile and/or weight profile. In some instances, the pet treat dispenser may only prevent such dispensing for a defined period of time. This time may, for example, be a time after which a customer is expected to have left a premises associated with the pet treat dispenser. By way of example, the defined period of time may be in the range of fifteen to ninety minutes.

In some implementations, the pet treat dispenser may be integrated into or connected with an ATM.

In some implementations, the ATM style pet treat dispenser of claim 1 may further include a value instrument dispenser, a card reader, an input device, a display, a communication module and a processor. The processor may be coupled to the communications module, the value instrument dispenser, the card reader, the controller, the display and the input device. The processor may be configured to authenticate a customer as being associated with a card, or other token, that has been read by the card/token reader. Such authentication may be based on input received at the input device. The processor may be configured to selectively control the value instrument dispenser after authentication of the customer. The processor may be configured to place the controller in an active state in which it may activate the pet treat dispenser in response to completion of an action requiring input from the input device. That is, the customer may perform a certain operation on the ATM to enable the pet treat dispensing. In some instances, such operations may be configured to ensure that the pet treats are only dispensed to pets associated with a customer.

As noted above, the processor of the ATM may be configured to place the controller of the pet treat dispenser in an active state in response to completion of an action requiring input from the input device. The action requiring input from the input device may include successfully authenticating the customer based on input received via the input device. That is, the pet treat dispenser may only be configured to dispense a treat after authentication of a customer has been completed. This authentication may ensure that the pet is associated with a customer. After authentication, the controller of the pet treat dispenser may be changed from an inactive state to an active state to allow dispensing upon detecting the presence of a pet. In some instances, the active state may only be enabled until a particular condition is met, after which the state may be inactive once again. This particular condition may be, for example, a timeout.

In some implementations, the action requiring input from the input device which causes the processor of the ATM to place the controller of the pet treat dispenser in an active state may include dispensing a value instrument via the value instrument dispenser based on input received via the input device. That is, when a customer performs a certain operation, such as withdrawing money from the ATM, the pet treat dispenser may be activated. In some implementations, the controller and processor may be configured to communicate to configure the pet treat to be dispensed via the pet treat dispenser concurrently with the value instrument via the value instrument dispenser. That is, the pet may receive the pet treat at the same time that the customer receives the value instrument.

In some implementations, the action requiring input from the input device which causes the processor of the ATM to place the controller of the pet treat dispenser in an active state may include an account management operation. By way of example, when the customer initiates a transfer between accounts, the controller of the pet treat dispenser may be placed in the active state. Put differently, the customer may be required to complete a particular operation before the pet treat dispenser will dispense the pet treat.

In some implementations, the action requiring input from the input device which causes the processor of the ATM to place the controller of the pet treat dispenser in an active state may include input of a confirmation that a pet treat is to be dispensed. For example, the customer may confirm, using the input device, that the pet is to receive the pet treat before it may be dispensed. In some cases, a display of the ATM may indicate a type of treat that will be dispensed and, in some cases, nutritional or ingredient information, before prompting for such input.

For example, the controller of the pet treat dispenser may be configured to provide a signal to the processor of the ATM to indicate the presence of a pet at the particular location. The processor may be configured to control the display to output a request for input to confirm that a pet treat should be dispensed when the signal indicates the presence of a pet at the particular location.

Figure 7A:
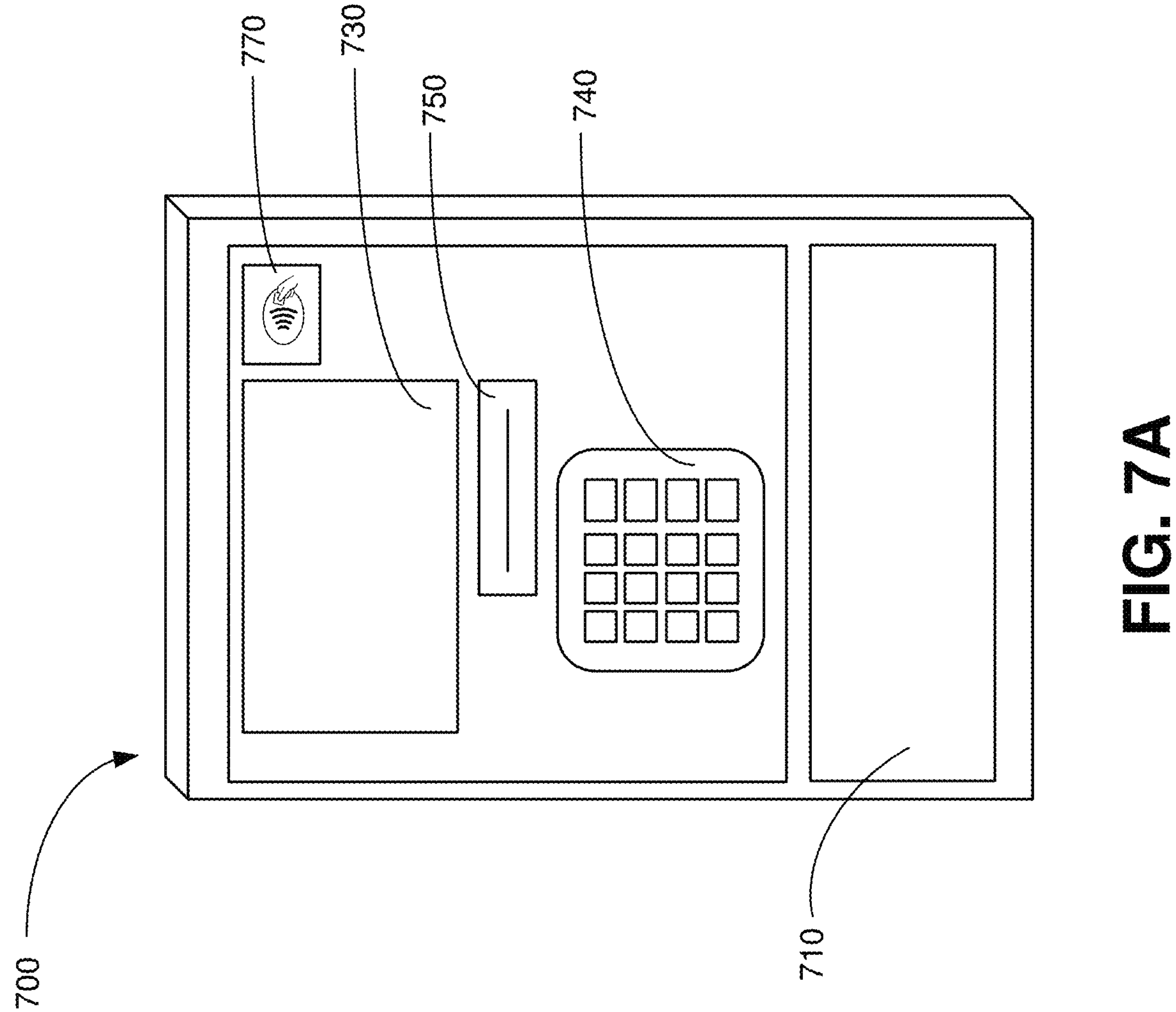
FIGS. 7A and 7B are simplified diagrams showing components of an automated teller machine according to the subject matter of the present application with an access panel of the automated teller machine closed and opened, respectively.
Figure 7B:
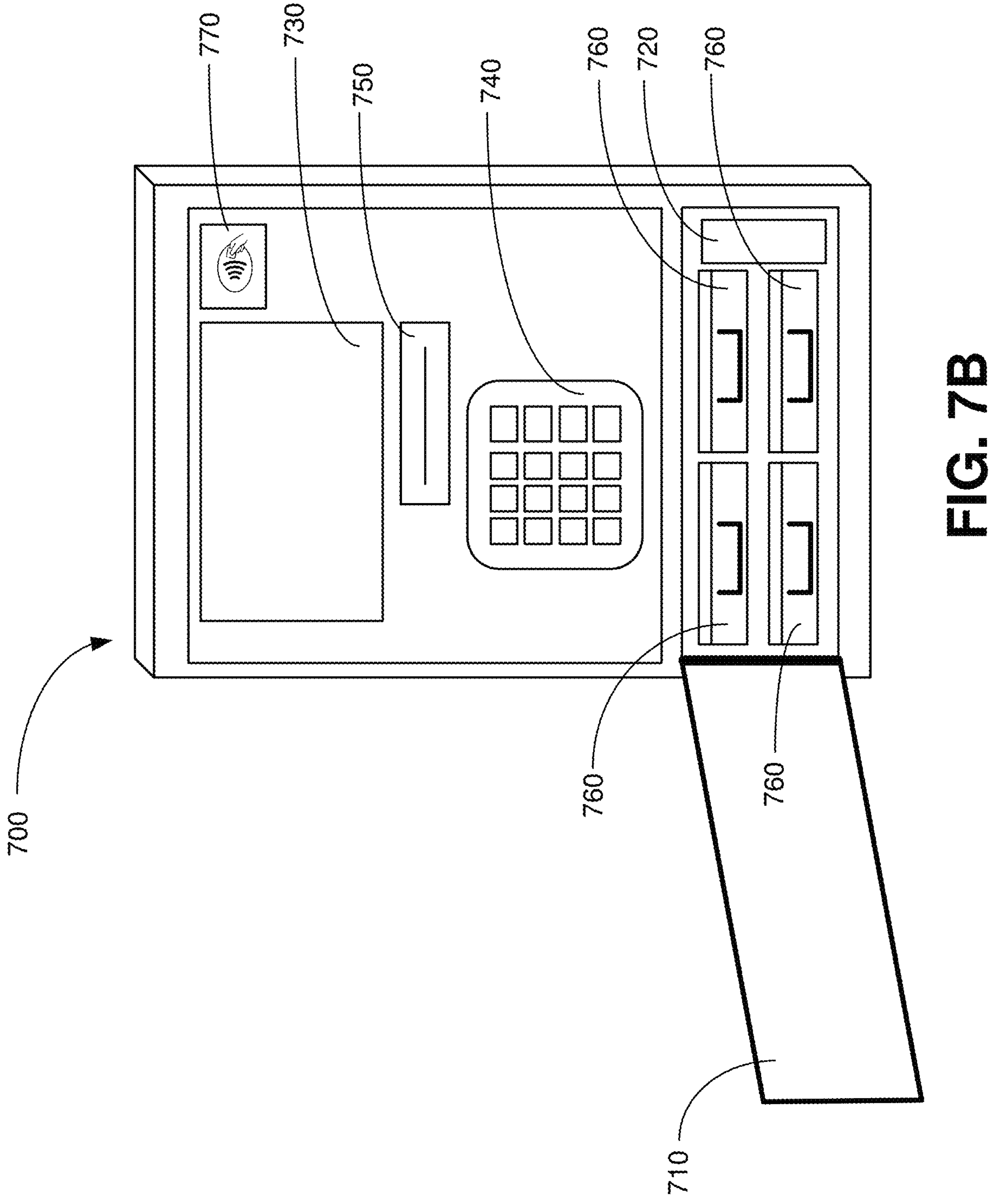

An example ATM is illustrated in FIGS. 7A and 7B. The example ATM may include a processor that is coupled to the controller of the pet treat dispenser. That is, the processor of the ATM may communicate with the controller of the pet treat dispenser. Such communication may be wired or wireless, or a combination of wired and wireless. In some cases, the pet treat dispenser may be integrated into the ATM. That is, FIGS. 7A and 7B may be modified to include the features of the pet treat dispenser described herein.

FIG. 7A and FIG. 7B are simplified diagrams showing the automated teller machine 700. FIG. 7A shows the automated teller machine 700 with an access panel 710 closed and may correspond to the configuration of the automated teller machine 700 during use. FIG. 7B shows the automated teller machine 700 with the access panel 710 opened to reveal certain internal components and may correspond to the configuration of the automated teller machine 700 during servicing.

As illustrated, the automated teller machine 700 may include a controller 720 (FIG. 7B), a display 730, a keypad 740, an item dispenser 750, cassettes 760 (FIG. 7B), and a token reader 770, which may also be referred to as a card reader. The token reader 770 may be a wireless token reader.

As further described below, the controller 720 is a computing device. For example, the controller 720 may include a processor that executes instructions retrieved from a computer-readable medium thereby causing the automated teller machine 700 to perform operations for providing access to banking services including access to withdrawals that are authorized based on a single authentication factor.

The display 730 may for example, be a liquid-crystal display (LCD), a cathode-ray tube (CRT), or the like. The display 730 is for presenting information such as to a user of the automated teller machine 700. The display 730 may present information under control of the controller 720.

The keypad 740 is an input device allowing input to be provided to the automated teller machine 700. Input received via the keypad 740 may be conveyed to the controller 720.

The item dispenser 750 is a device allowing value instruments to be dispensed by the automated teller machine 700. For example, it may be that the item dispenser 750 provides a single slot through which value instruments may be dispensed. Additionally or alternatively, the item dispenser 750 may provide multiple slots. It may be that components or units of the item dispenser 750 are specialized to a particular type or types of value instrument. For example, a particular component or unit of the item dispenser 750 may be adapted to receiving and/or dispensing banknotes of one denomination, while another component or unit may be adapted to receiving and/or dispensing banknotes of another denomination. Alternatively, it may be that the item dispenser 750 is a monolithic unit that handles all manner of value instruments.

As mentioned above, the automated teller machine includes one or more cassettes 760. The item dispenser 750 is in communication with the cassettes 760. Some or all of the cassettes 760 may be adapted to dispense value instruments. For example, some of the cassettes 760 may be for dispensing banknotes of particular denominations.

The item dispenser 750 and the cassettes 760 may be collectively considered a value instrument dispenser adapted to dispense value instruments such as to satisfy withdrawals from the automated teller machine 700.

The wireless token reader 770 allows data to be exchanged with wireless authentication tokens. The wireless token reader 770 is a wireless communications module. The wireless token reader 770 may communicate with authentication tokens using one or more wireless protocols. In a particular example, the wireless token reader may use near-field communication (NFC) to communicate with authentication tokens. Authentication tokens with which the wireless token reader 770 communicates may take a variety of forms. For example, authentication tokens with which the wireless token reader 770 may communicate may include NFC-enabled ISO-sized cards and/or NFC-enabled devices such as, for example, NFC-enabled smartphones, smartwatches or other wearables, or implants such as, for example, implantable NFC-enabled microchips.

The automated teller machine 700 may be deployed in a variety of manners. For example, the automated teller machine 700 may, in some cases, operate in a partially offline mode. Additionally or alternatively, the automated teller machine 700 may communicate with one or more other computing devices in order to perform its various functions.

Figure 8:
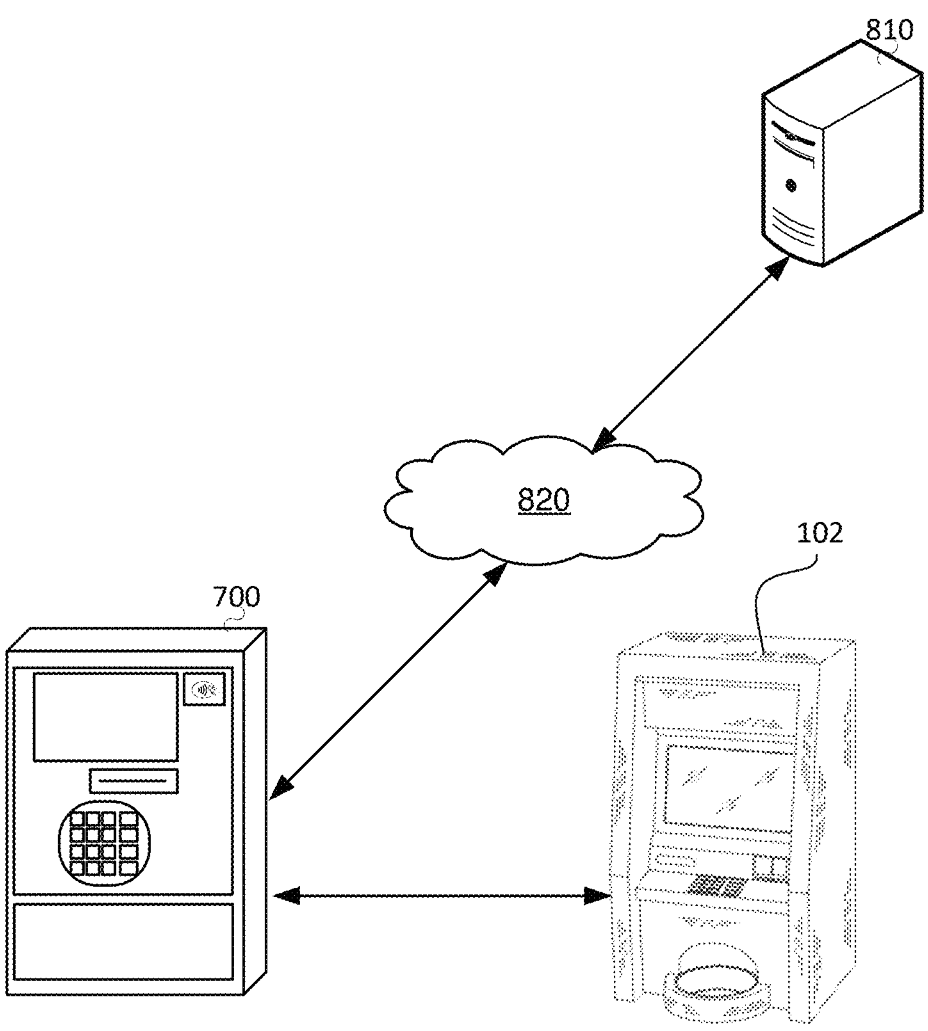
FIG. 8 is a schematic operation diagram illustrating an operating environment of the automated teller machine of FIGS. 7A and 7B.

An example operating environment in which the automated teller machine 700 communicates with another computing device is shown in FIG. 8. As illustrated, the automated teller machine 700 may be in communication with a back-office server system 810 via a network 820.

The automated teller machine 700 and the back-office server system 810 may be in geographically disparate locations. Put differently, the automated teller machine 700 may be remote from the back-office server system 810, and vice-versa.

The automated teller machine 700 and the back-office server system 210 are computer systems.

As mentioned above, the automated teller machine 700 is adapted to provide access to banking services such as, for example, withdrawals executed based on only a single authentication factor.

The back-office server system 810 is a server that provides one or more back-office services to a financial institution including, for example, maintenance of accounts, payment processing, fraud detection and the like. The back-office server system 810 may, for example, be a mainframe computer, a minicomputer, or the like. In some embodiments, the back-office server system 810 may be formed of or may include one or more computing devices. For example, the back-office server system 810 may include and/or may communicate with multiple computing devices such as, for example, database servers, compute servers, and the like. For example, the back-office server system 810 may be, may include and/or may communicate with an ATM switch and/or an ATM middle tier system. Multiple computing devices such as these may be in communication using a computer network. For example, such computing devices may communicate using a local-area network (LAN). In some embodiments, the back-office server system 810 may include multiple computing devices organized in a tiered arrangement. For example, the back-office server system 810 may include middle tier and back-end computing devices such as, for example, the aforementioned ATM middle tier system and/or one or more financial institution and/or ATM system back-end server systems. In some embodiments, the back-office server system 810 may be a cluster formed of a plurality of interoperating computing devices.

The network 820 is a computer network. In some embodiments, the network 820 may be an internetwork such as may be formed of one or more interconnected computer networks. For example, the network 820 may be or may include an Ethernet network, an asynchronous transfer mode (ATM) network, a wireless network, and/or the like. Additionally or alternatively, one or more devices may communicate with the computer network by way of a plain-old telephone service (POTS) line such as using a modem. In a particular example, the automated teller machine 700 may communicate with the back-office server system 810, directly or indirectly, by way of a POTS line.

As further described below, in some embodiments, the automated teller machine 700 and the back-office server system 810 may co-operate to allow the automated teller machine 700 to provide access to banking services such as, for example, withdrawals including withdrawals such as may be authorized based on a single authentication factor.

Figure 3:
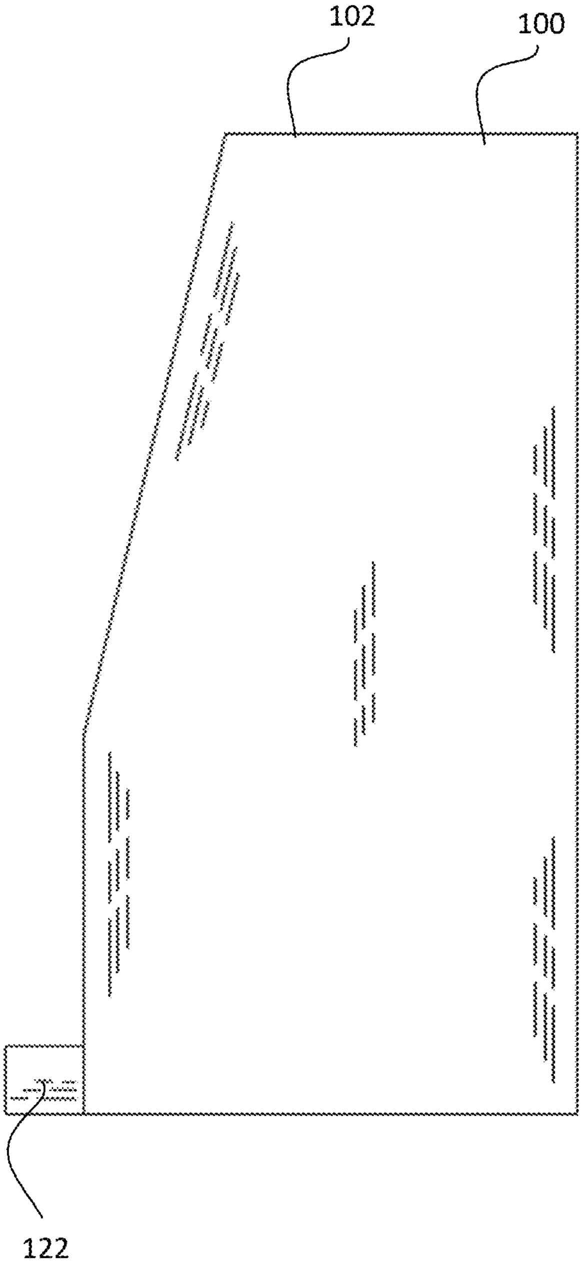
FIG. 3 is a right side view of the pet treat dispenser.
Figure 4:
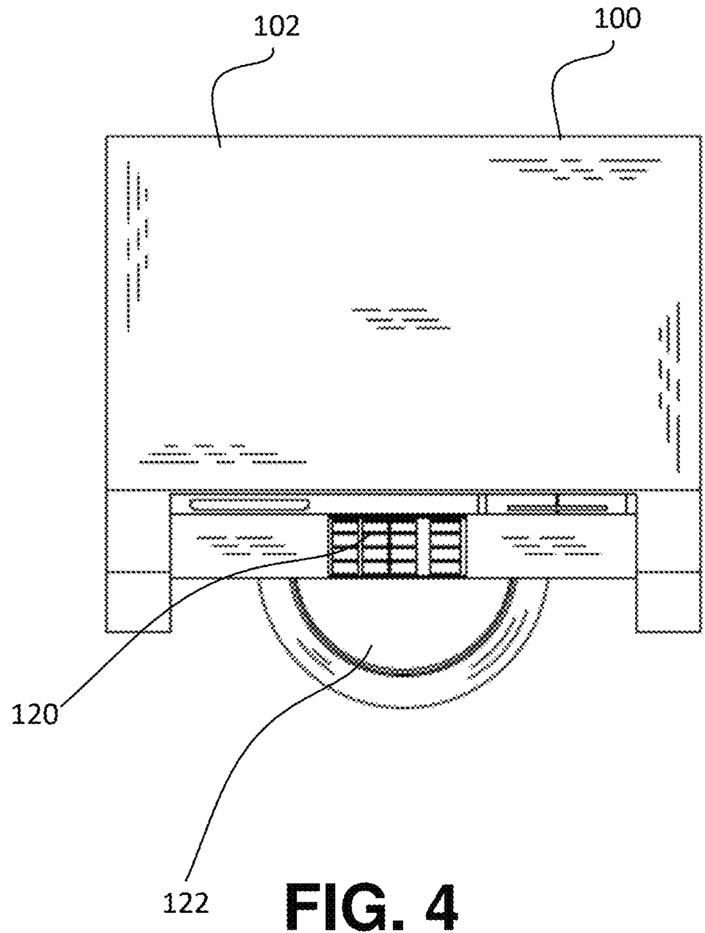
FIG. 4 is a top plan view of the pet treat dispenser.

Returning to discussion of particulars of the automated teller machine 700, FIG. 3 is a logical block diagram of the automated teller machine 700.

Figure 9:
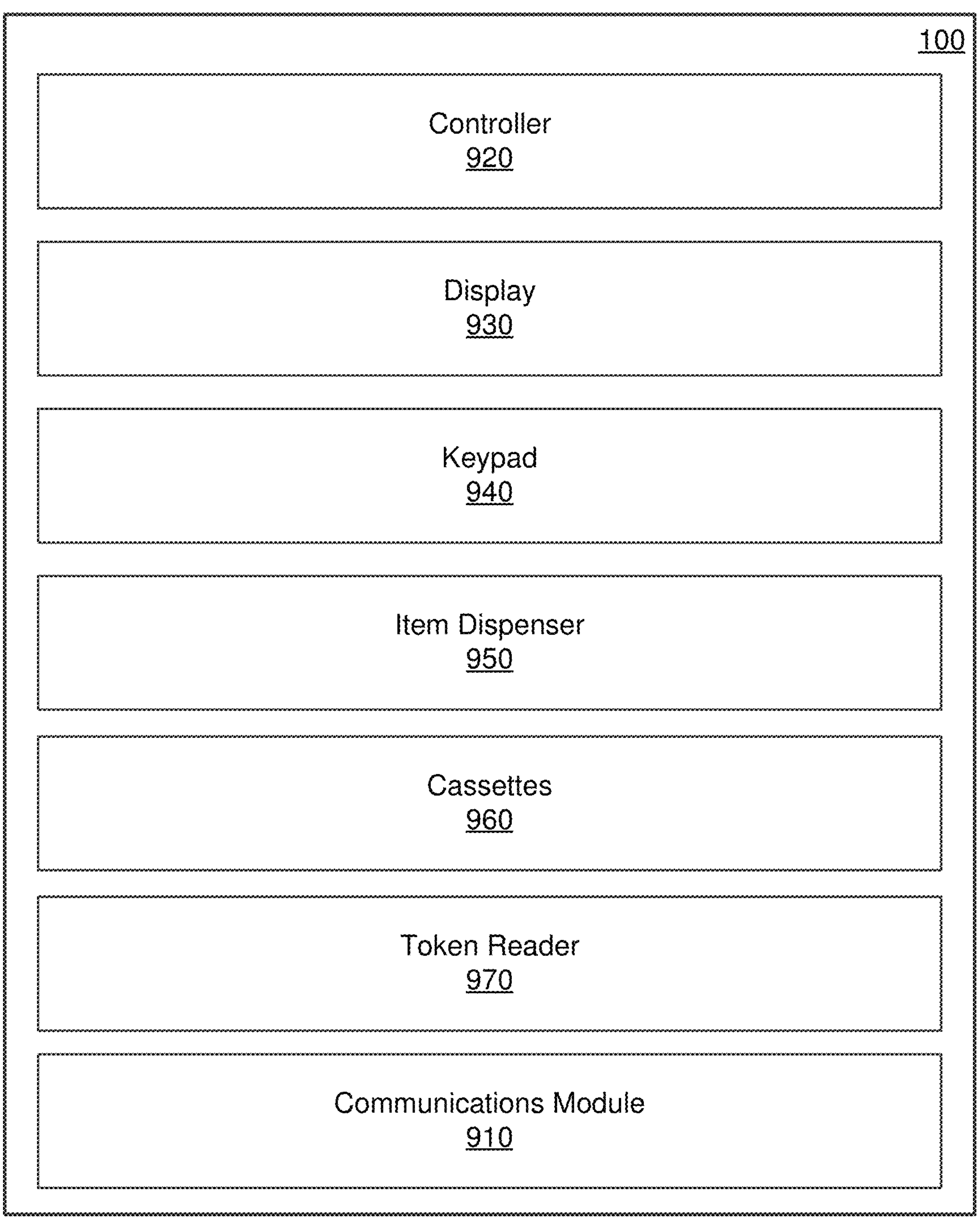
FIG. 9 is a logical block diagram of the automated teller machine of FIGS. 7A and 7B.

As described above, the automated teller machine 700 may include a controller 720, a display 730, a keypad 740, an item dispenser 750, cassettes 760, and/or a wireless token reader 770. Additionally, as shown in FIG. 9, the automated teller machine 700 may include a communications module 910.

The communications module 910 allows the automated teller machine 700 to communicate with other computing devices and/or various communications networks such as, for example, the network 820. In other words, the communications module 910 may allow the automated teller machine 700 to send or receive communications signals. Communications signals may be sent or received according to one or more protocols or according to one or more standards. For example, the communications module 910 may allow the automated teller machine 700 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 910 may allow the automated teller machine 700 to communicate via Wi-Fi™ or via some combination of one or more networks or protocols. In some embodiments, the wireless token reader 770 may be included in, may rely on, or may include the communications module 910.

Figure 10:
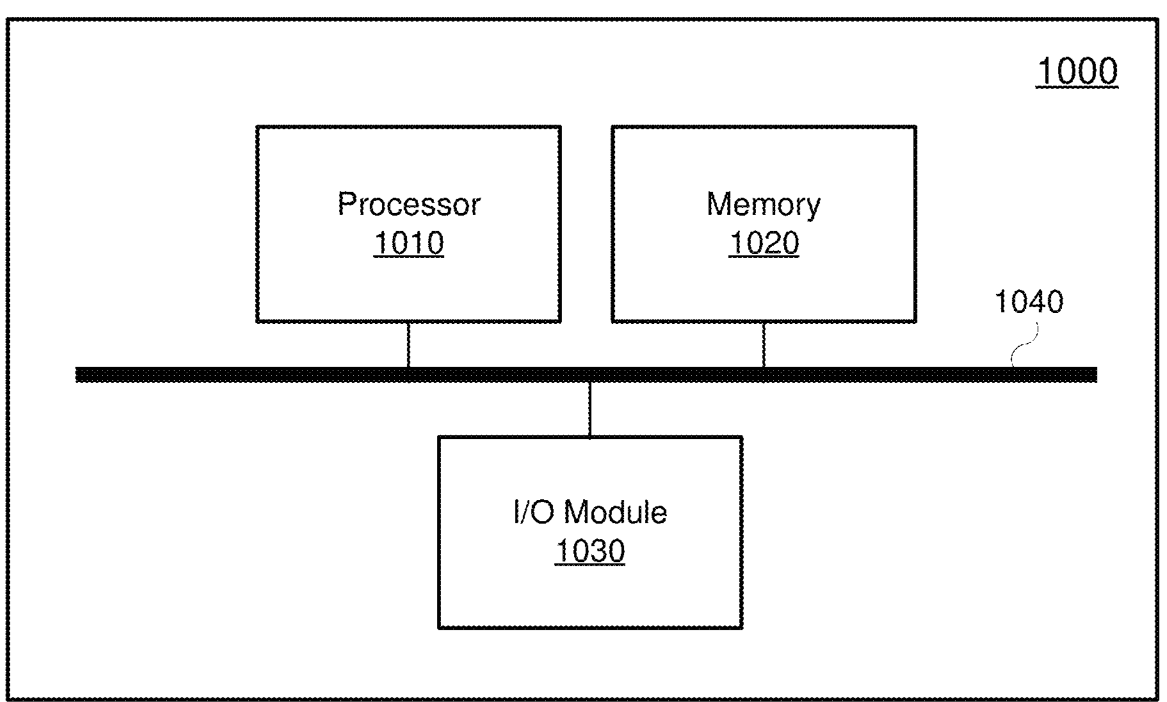
FIG. 10 is a high-level operation diagram of an example computing device.

FIG. 10 is a high-level operation diagram of an example computing device 1000. In some embodiments, the example computing device 1000 may be exemplary of one or more of the controller 720 (FIG. 7B) and the back-office server system 810 (FIG. 8). As will be discussed in greater detail below, the automated teller machine 700 (FIG. 7) (and, potentially, the controller 720 in particular) includes software that adapts it to perform a particular function. More particularly, software of the automated teller machine 700 adapts it to perform functions including withdrawals authorized based on a single authentication factor. As mentioned above, the automated teller machine 700 may co-operate with the back-office server system 810 in providing access to banking services. Software of the back-office server system 810 may adapt it to co-operate with the automated teller machine in providing access to banking services.

The example computing device 1000 includes a variety of modules. For example, as illustrated, the example computing device 1000 may include a processor 1010, a memory 1020, and an input/output (I/O) module 1030. As illustrated, the foregoing example modules of the example computing device 1000 are in communication over a bus 1040.

The processor 1010 is a hardware processor. The processor 1010 includes at least one physical processor and at least one core, but may also include more than one physical processor and/or more than one processor core. For example, the processor 1010 may, for example, be one or more ARM, Intel x86, PowerPC processors or the like.

The memory 1020 allows data to be stored and retrieved. The memory 1020 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 1000.

The I/O module 1030 allows the example computing device 1000 to interact with devices such as, for example, peripherals to send and receive data. The I/O module 1030 may, for example, allow the example computing device 1000 to interface with input devices such as, for example, keypads, keyboards, pointing devices, and the like. In another example, the I/O module 1030 may, for example, allow the example computing device 1000 to interface with output devices such as, for example, displays, printers, and the like. In a particular example, where the example computing device 400 forms a part of the automated teller machine 700 (FIG. 7A) such as, for example, if the example computing device 400 is or forms a part of the controller 720 (FIGS. 7A and 7B) of the automated teller machine 700, the I/O module 430 may allow the example computing device 400 to interface with one or more of the display 730, the keypad 740, the item dispenser 750, the wireless token reader 770, and/or the communications module 910 depending, for example, on the particular configuration of the controller 720 and the components present in a given automated teller machine.

Software comprising instructions is executed by the processor 1010 from a computer-readable medium. For example, software may be loaded into random-access memory from persistent storage of the memory 1020. Additionally or alternatively, instructions may be executed by the processor 1010 directly from read-only memory of the memory 1020.

Figure 11:
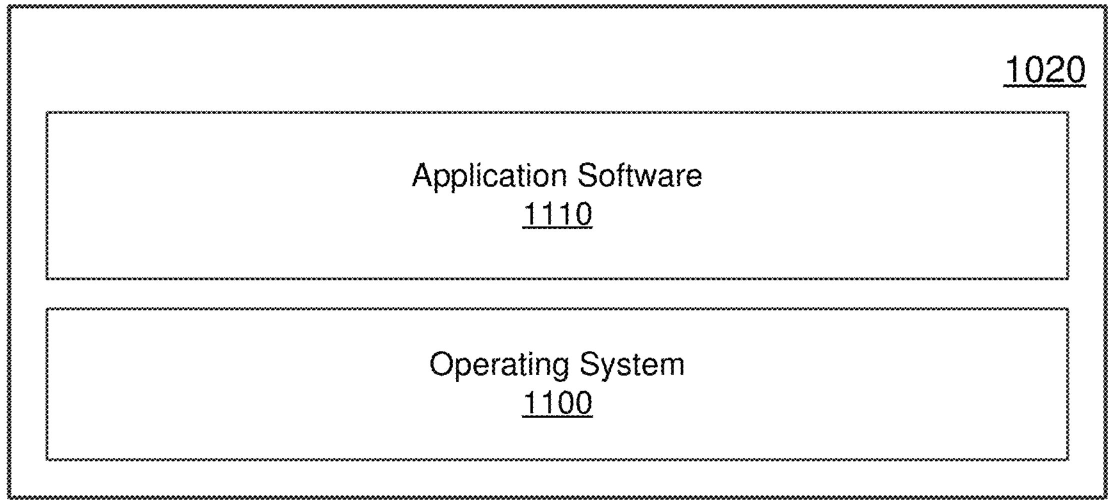
FIG. 11 depicts an example simplified software organization of the example computing device of FIG. 10.

FIG. 11 depicts a simplified organization of software components stored in the memory 1020 of the example computing device 1000. As illustrated these software components include an operating system 1100 and application software 1110.

The operating system 1100 is software. The operating system 1100 allows the application software 1110 to access the processor 1010, the memory 1020, and the I/O module 1030. The operating system 1100 may be, for example, UNIX™, Linux™, Microsoft™ Windows™, Apple OSX™ or the like.

The application software 1110 adapts the example computing device 1000, in combination with the operating system 1100, to operate as a device performing a particular function. For example, the application software 1110 may cooperate with the operating system 1100 to adapt a suitable embodiment of the example computing device 1000 to operate as the controller 720 (FIGS. 7B and 8) of the automated teller machine 700 or as the back-office server system 810 (FIG. 8).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. An automated teller machine (ATM) style pet treat dispenser comprising:

a housing resembling an ATM, the housing defining an opening;

a pet treat dispenser disposed within the housing and arranged to output a treat through the opening;

a pet presence detector configured to generate a signal indicating the presence of a pet at a particular location relative to the housing; and a controller configured to activate the pet treat dispenser in response to detecting the presence of a pet at the particular location relative to the housing based on the signal indicating the presence of the pet.

2. The ATM style pet treat dispenser of claim 1, wherein the pet presence detector includes a pressure sensitive mat and wherein the controller is configured to activate the pet treat dispenser based on a pressure indicated by the pressure sensitive mat.

3. The ATM style pet treat dispenser of claim 2, wherein the pressure sensitive mat is situated on a floor at a front side of the housing.

4. The ATM style pet treat dispenser of claim 2, wherein the controller is configured to define a dispensing parameter for the pet treat dispenser to control an amount of pet treats dispensed based on the pressure indicated by the pressure sensitive mat so that a greater amount of pet treats are distributed to a larger pet than to a smaller pet.

5. The ATM style pet treat dispenser of claim 1, wherein the pet presence detector includes a camera and wherein the pet presence detector detects presence of the pet at the particular location based on an automated analysis of camera data generated by the camera.

6. The ATM style pet treat dispenser of claim 5, wherein the pet presence detector detects a pet type based on an automated analysis of the camera data generated by the camera and wherein the controller is configured to define a dispensing parameter for the pet treat dispenser based on the detected pet type.

7. The ATM style pet treat dispenser of claim 6, wherein configuring the dispensing parameter includes one or more of: configuring an amount of pet treats dispensed to the pet based on the pet type; and configuring a type of pet treat dispensed to the pet based on the pet type.

8. The ATM style pet treat dispenser of claim 1, further comprising:

a display situated at a location corresponding to a location of a display in an ATM, and wherein the controller is configured to cause the display to be updated in response to detecting the presence of the pet at the particular location.

9. The ATM style pet treat dispenser of claim 8, wherein updating the display includes outputting a video that is based on one or both of a size and type of the pet.

10. The ATM style pet treat dispenser of claim 9, wherein outputting the video that is based on one or both of a size and type of the pet includes retrieving a video from a memory based on one or both of the size and type of the pet.

11. The ATM style pet treat dispenser of claim 8, wherein the controller is further configured to:

generate a video using generative artificial intelligence based on data obtained from the pet presence detector, and wherein updating the display includes outputting the video.

12. The ATM style pet treat dispenser of claim 1, further comprising:

a value instrument dispenser;

a card reader;

an input device;

a display;

a communication module; and a processor coupled to the communications module, the value instrument dispenser, the card reader, the controller, the display and the input device, the processor configured to authenticate a customer as being associated with a card read by the card reader using input received at the input device and to selectively control the value instrument dispenser after authentication of the customer, and wherein the processor is configured to place the controller in an active state in which it may activate the pet treat dispenser in response to completion of an action requiring input from the input device.

13. The ATM style pet treat dispenser of claim 12, wherein the action requiring input from the input device includes successfully authenticating the customer based on input received via the input device.

14. The ATM style pet treat dispenser of claim 12, wherein the action requiring input from the input device includes dispensing a value instrument via the value instrument dispenser based on input received via the input device.

15. The ATM style pet treat dispenser of claim 12, wherein the action requiring input from the input device includes an account management operation.

16. The ATM style pet treat dispenser of claim 12, wherein the action requiring input from the input device includes input of a confirmation that a pet treat is to be dispensed.

17. The ATM style pet treat dispenser of claim 16, wherein the controller is configured to provide a signal to the processor to indicate the presence of a pet at the particular location, and wherein the processor is configured to control the display to output a request for input to confirm that a pet treat should be dispensed when the signal indicates the presence of a pet at the particular location.

18. The ATM style pet treat dispenser of claim 12, wherein the controller and processor are configured to communicate to configure the pet treat to be dispensed via the pet treat dispenser concurrently with a value instrument via the value instrument dispenser.

19. The ATM style pet treat dispenser of claim 1, wherein the opening is configured to resemble a value instrument dispenser.

20. The ATM style pet treat dispenser of claim 1, wherein the controller is configured to store a profile of the detected pet and to prevent immediate dispensing of a further treat to the detected pet.

* * * * *